Feb. 1, 1949. W. TRAUPEL 2,460,610
GAS TURBINE PLANT
Filed Jan. 28, 1944 2 Sheets-Sheet 1
Fig.1,
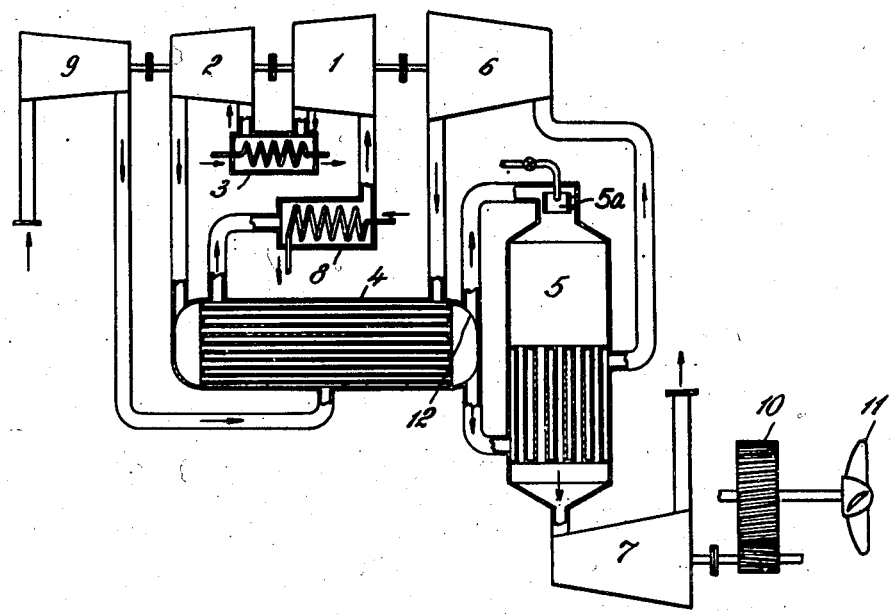
INVENTOR
Walter Traupel
BY
ATTORNEYS Feb. 1, 1949 W. TRAUPEL 2,460,610
GAS TURBINE PLANT
Filed Jan. 28, 1944 2 Sheets-Sheet 2
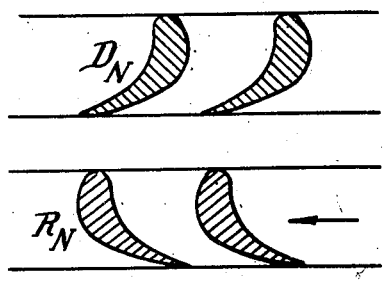
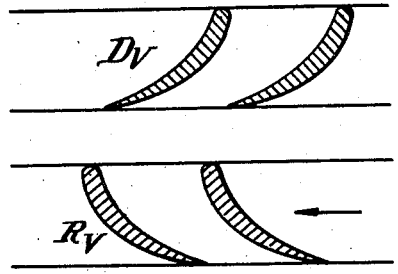
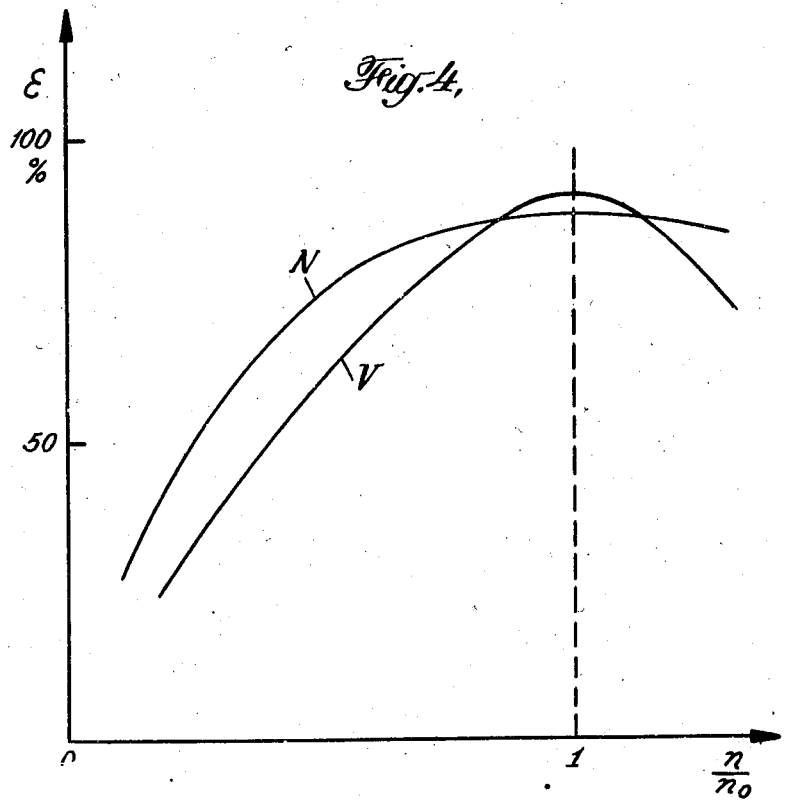
INVENTOR
Walter Traupel
BY
ATTORNEYS Patented Feb. 1, 1949

2,460,610

UNITED STATES PATENT OFFICE 2,460,610

GAS TURBINE PLANT

Walter Traupel, Winterthur, Switzerland, assignor to Sulzer Frères, Société Anonyme, Winterthur, Switzerland Application January 28, 1944, Serial No. 520,048
In Switzerland May 8, 1943

2 Claims. (Cl. 60—49)

The invention relates to a gas turbine plant in which at least one turbine is provided for driving the compressor and at least one other turbine for producing the useful output. The turbine driving the compressor works at essentially the same speed at different loads, but the turbine producing the useful output works at different speeds when the load differs. The invention is characterised in that at least the majority of the blades of the useful output turbine have a greater curvature than the majority of the blades of the compressor turbine.

The invention is explained in more detail below with the aid of the drawings, which illustrate one embodiment of it.

Fig. 1 shows a gas turbine plant in which the invention can be applied.

Fig. 2 shows a part of a developed cylinder section through a guide blade of the useful output turbine and the rotor blade following it.

Fig. 3 shows a corresponding section through a guide blade and a rotor blade of the compressor turbine.

Fig. 4 gives a comparative diagram showing the course taken by the efficiency $\epsilon$, on the one hand for turbines with blade forms as shown in Fig. 2 and on the other hand for turbines with blade forms as shown in Fig. 3, as a function of the speed ration $n/n_0$, where $n$ is any of the different turbine speeds and $n_0$ the speed at normal load.

The working medium compressed by compressor 1 (Fig. 1) passes through the intermediate cooler 3 into the compressor 2 and, after having been compressed to the maximum working pressure, is preheated in the pipes of a heat-exchanger 4. At the outlet 12 of the heat-exchanger the flow of working medium is divided. Part of it passes into the heater 5 and while flowing over the heat-exchange pipes is brought up to the maximum working temperature.

The compressed and heated working medium expands in the turbine 6 and then passes into the space surrounding the heat-exchange pipes of the heat-exchanger 4, where it gives up part of its residual heat to the working medium coming from the compressor 2. A further part of its residual heat is given up to a cooling-medium in the cooler 8, whereupon the working medium again flows to the low-pressure compressor 1.

The other part of the working medium divided at the outlet 12 of the heat-exchanger 4 is withdrawn from the circuit and supplied as combustion air to a gas burner 5a of the gas heater 5. The combustion gases flow through the heat-exchange pipes and then pass into the turbine 7 from which they can be led off after expansion to further points of consumption not shown in the drawing, for instance to heat-exchangers, or to atmosphere.

To the open circuit of the plant the compressor 9 continually supplies from atmosphere a make-up quantity of air great enough not only to replace the quantity continually withdrawn from the circuit but also to cover all losses. This make-up quantity is introduced to the heat-exchanger 4 at a point at which the working medium flowing back from the turbine 6 is at roughly the same temperature as the compressed make-up air.

The turbine 6 operated by the flow of working medium in the plant drives the compressors 1, 2 and 9, while the turbine 7 operated by the quantity withdrawn from the circuit produces the useful output given up to the outside. This useful output turbine drives the ship's screw 11 by way of a gear 10.

The turbine 6 and the compressors 1, 2 and 9 coupled to it are driven at the same speed whatever the load. This arrangement makes it possible, when the pressure level or the density in the circuit is duly adapted to the load, to maintain unchanged the most favourable flow conditions for the blades both of the turbine and of the compressors, whatever the load may be. For this purpose the compressor 9 delivering the make-up quantity can be equipped with devices for adjusting the delivery pressure of the delivery quantity, with the speed remaining approximately constant. The pressure level of the circuit is then adjusted higher or lower according to the delivery output or the delivery pressure of the compressor 9.

The speed of the useful output turbine 7, on the other hand, changes with the driving power required in accordance with the propeller law. When the driving power required is small, the speed is lower than when the driving power is greater.

In the gas turbine plane shown in Fig. 1 the blading of the useful output turbine 7 is designed according to the blade sections given in Fig. 2, where the guide blade is designated $D_N$ and the rotor blade $R_N$.

The blading of the compressor turbine 6 in the plant according to Fig. 1 has the form shown in the blade sections in Fig. 3. Here the guide blading is designated $D_V$ and the rotor blading $R_V$.

A comparison of the blade forms in Figs. 2 and 3 shows that the blades of the useful output turbine (Fig. 2) have a sharper curvature than the blades of the compressor turbine (Fig. 3). It will be noted that the blades of the useful output turbine 7 (Fig. 2) have a deflecting angle (angle between the outward direction of the flow from the blading $D_N$ and the inward direction of flow into the blading $R_N$) of about 79°, while the blades of the turbine 6 (Fig. 3) have a deflecting angle of about 49°. Hence, the ratio of the deflecting angles is about 1.6 to 1.

The forms suggested in the invention for the turbine blading are based on the results of the most recent flow research, which indicate that for turbines with sharply curved blades—in particular when their profile is broad—the efficiency curve takes a flat course as embodied in the curve N (Fig. 4). In contrast to this, for turbines having blades which are only gently curved—and preferably a thin profile—the efficiency curve is steep, as seen in curve V of Fig. 4. In the former case the efficiency does not rise quite to the same maximum value, but in return for this only falls off very slowly on both sides. The efficiency curve for more gently curved blades (V) rises to particularly high maximum values but falls rapidly on both sides.

As the compressor drive requires a power which is considerably greater—usually even several times greater—than the useful output, and as at the same time the compressors are run, at least over a wide range of loads, at the same speed, the increased efficiency of the gently curved blades as shown in curve V (Fig. 4) is a matter of great importance for the final overall efficiency. On the other hand, the blading of the useful output turbine, whose speed changes over a wide range in accordance with the propeller law, must have a flat efficiency curve in order to be able to keep the overall efficiency at as high as possible a value over a wide range of loads.

The invention can also be applied to cases in which the useful output turbine is included in the circuit and the compressor turbine is driven by the exhaust gases withdrawn from the circuit, or in which both turbines are included in a closed circuit, or finally in which both turbines are driven by a flow of gas passing through them once only. The invention can be employed not only for marine plants but also for land plants, in which the speed of the useful output turbine changes with the output.

I claim:

1. A gas tubine plant comprising compressor means, a heater, a gas turbine, conduit means connecting the compressor means, the heater and the gas turbine and forming a circuit for a gaseous working medium to flow serially through said compressor means, said heater and said turbine, a fuel burner for the heater, means for withdrawing a portion of the gaseous working medium from said circuit and conducting it to said burner to form one of the constituents of a combustible mixture, a turbine for delivering the useful output of the plant at varying speeds, said last-named turbine being driven by exhaust gases from said heater, and a make-up compressor connected to the circuit for the working medium for delivering compressed working medium to said circuit, said first-mentioned turbine driving said compressor means at substantially a constant speed, the pressure of the working medium in the circuit varying in accordance with variations of the load on the circuit, the curvature of at least the majority of the blades of the useful output turbine being sharper than the curvature of the majority of the blades of the turbine which drives the compressor means, whereby the overall efficiency of the plant is increased.

2. A gas turbine plant comprising compressor means, a gas heater, an air turbine, conduit means connecting the compressor means, the gas heater and the air turbine and forming a circuit for compressed air working medium to flow serially through said compressor means, said heater and said turbine, a gas burner for the gas heater, means for withdrawing a portion of the compressed air working medium from said circuit and conducting it to said gas burner to form one of the constituents of a combustible mixture, a turbine for delivering the useful output of the plant at varying speeds, said last-named turbine being driven by exhaust gases from said gas heater, and a make-up compressor connected to the circuit for the working medium for delivering compressed make-up air to said circuit, said air turbine driving said compressor means and said make-up compressor at substantially a constant speed, the pressure of the working medium in the circuit varying in accordance with variations of the load on the circuit, the curvature of at least a majority of the blades of the useful output turbine being sharper than the curvature of the majority of the blades of the air turbine to an extent such that the ratio of the deflecting angle of the blading of the useful output turbine to the deflecting angle of the blading of the air turbine is about 1.6 to 1, whereby the overall efficiency of the plant is increased.

WALTER TRAUPEL.

REFERENCES CITED

The following references are of record in the file of this patent:

UNITED STATES PATENTS

| Number | Name | Date |
| --- | --- | --- |
| 2,011,420 | Samuelson | Aug. 13, 1935 |
| 2,095,991 | Lysholm | Oct. 19, 1937 |
| 2,298,663 | Traupel | Oct. 13, 1942 |